Feb. 17, 1925.
G. S. BLAKESLEE
DISHWASHING MACHINE
Filed Jan. 7, 1920
1,526,957
2 Sheets-Sheet 1
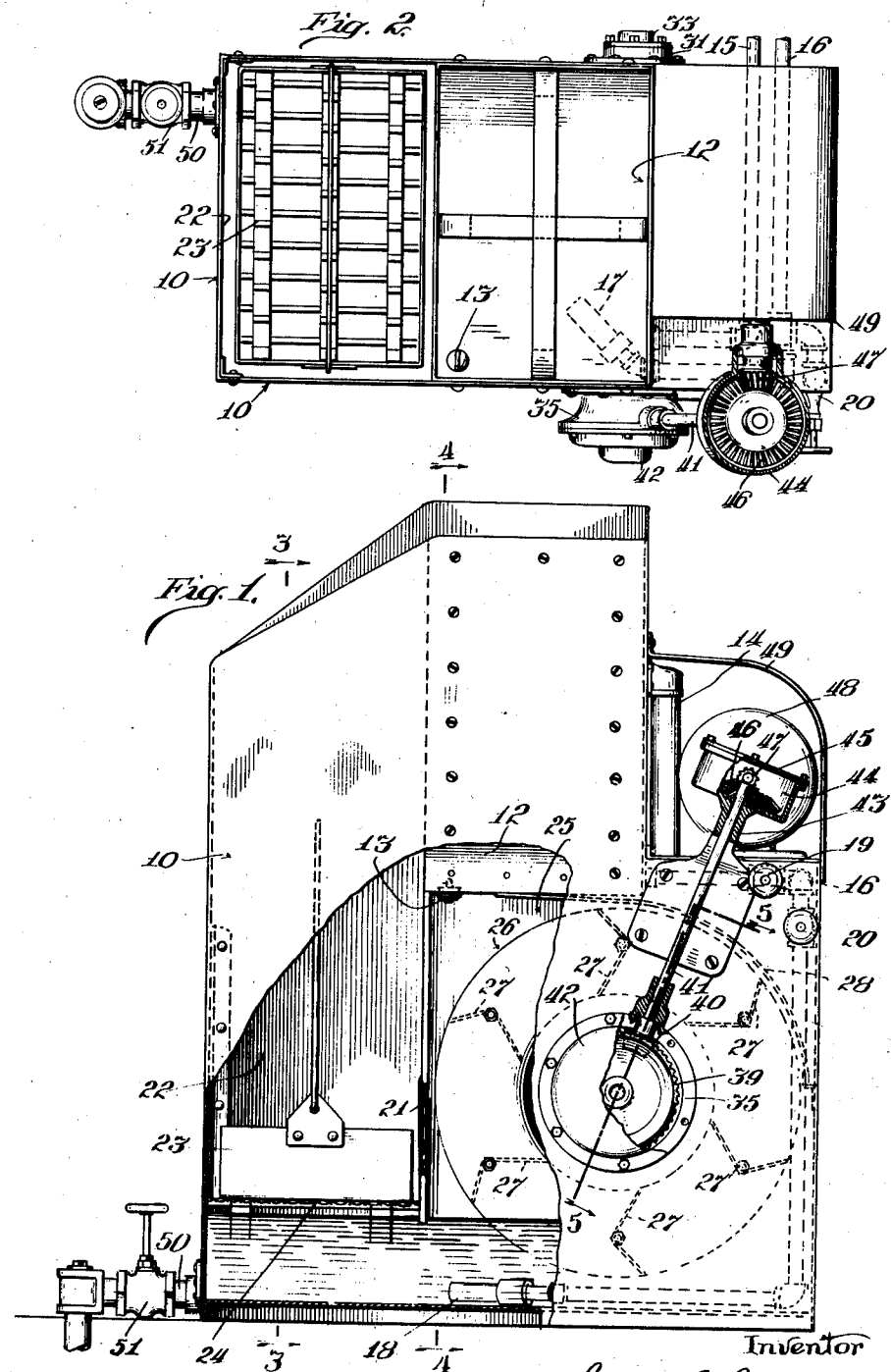

Feb. 17, 1925.
G. S. BLAKESLEE
1,526,957
DISHWASHING MACHINE
Filed Jan. 7, 1920          2 Sheets-Sheet 2
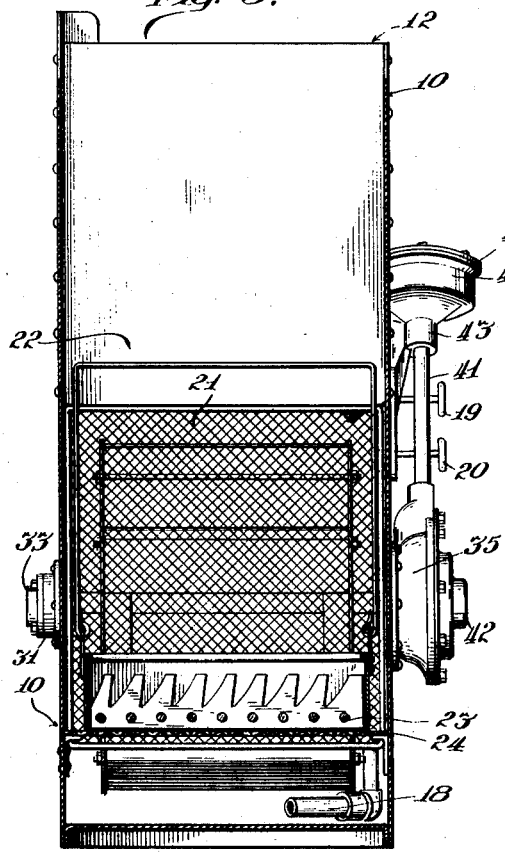
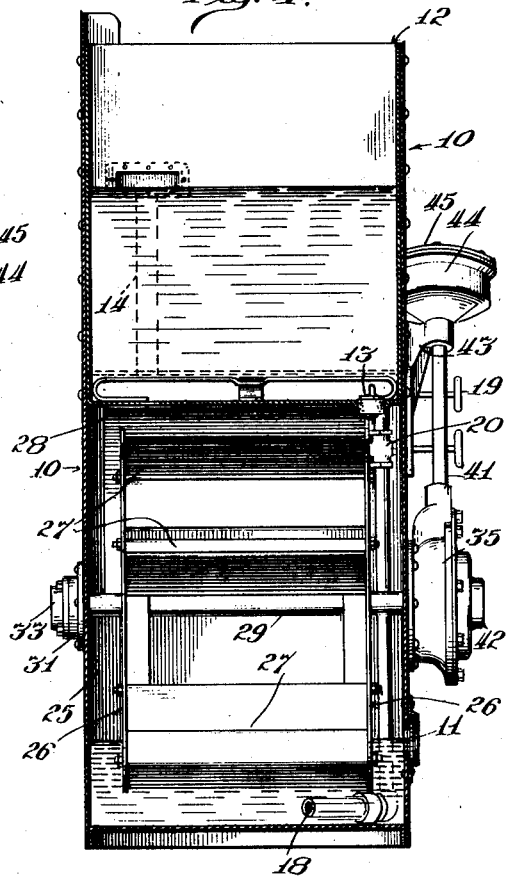
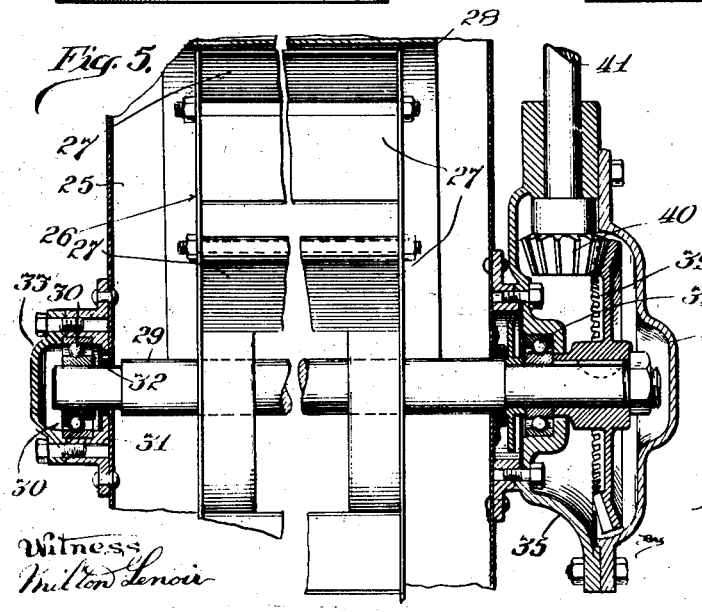

Patented Feb. 17, 1925.

1,526,957

UNITED STATES PATENT OFFICE.

GEORGE S. BLAKESLEE, OF OAK PARK, ILLINOIS; GEORGE R. BLAKESLEE EXECUTOR OF SAID GEORGE S. BLAKESLEE, DECEASED.

DISHWASHING MACHINE.

Application filed January 7, 1920. Serial No. 349,982.

*To all whom it may concern:*

Be it known that I, GEORGE S. BLAKESLEE, a citizen of the United States, and a resident of Oak Park, in the county of Cook and State of Illinois, have invented certain new and useful Improvements in Dishwashing Machines, of which the following is a specification, reference being had to the accompanying drawings.

My invention relates to washing machines and has for its object to provide a new and improved dish washing machine which may be made small and compact so that it will be suitable for use on dining cars and in other places where the available space is limited. The preferred construction by which I accomplish such object is illustrated in the drawings and is hereinafter described. What I believe to be new is set forth in the claims.

In the drawings,—

Fig. 1 is a side view of my improved machine, some parts being in section and other parts being broken away in order better to show the construction;

Fig. 2 is a top view;

Fig. 3 is a vertical cross-section taken on line 3—3 of Fig. 1;

Fig. 4 is a vertical cross-section taken on line 4—4 of Fig. 1; and

Fig. 5 is a cross-sectional view taken substantially on line 5—5 of Fig. 1.

Referring to the drawings,—10 indicates a tank adapted to contain a quantity of wash water, the height of which may be ascertained through a glazed sight opening 11 in one of the side walls of the tank, as shown in Fig. 4. 12 indicates a rinsing tank arranged over a portion of the tank 10, leaving a sufficient area thereof exposed for the introduction thereinto of baskets containing the dishes to be washed, as hereinafter described. Both tanks are open at the top, and the bottom of the tank 12 is preferably about midway between the top of the tank 10 and the normal level of the water therein, as shown in Fig. 1. A drain opens from the rinsing tank 12 into the lower portion of the tank 10 and is normally closed by a valve 13 of any suitable type. Also an overflow pipe 14 leads from the upper part of the tank 12 and discharges into the tank 10. Water is adapted to be supplied to the tank 12 by means of a pipe 15 from any suitable source and the tank 10 may, if desired, be filled by overflow from the tank 12. It will be understood that a suitable cleansing agent is added to the water in the tank 10.

The water in both tanks is adapted to be heated by means of steam from any suitable source admitted through a pipe 16 having nozzles 17, 18 opening respectively into the tanks 12 and 10, as shown in Figs. 1 and 2. The nozzles 17 and 18 are controlled by means of valves 19 and 20 respectively.

The lower portion of the tank 10 between the level of the water therein and the bottom of the tank 12 is divided by a screen 21, the lower margin of which extends into the water, as shown in Fig. 1. This screen preferably is in alinement with the inner transverse wall of the tank 12, so that a washing compartment 22 is provided which extends from near the level of the water in the tank 10 up alongside of the tank 12 and is open at the top for the reception of a suitable dish holding basket 23. A screen 24 in the compartment 22 near the water level supports the basket during the washing operation.

At the opposite side of the screen 21 and under the tank 12 is a paddle wheel compartment 25 in which is mounted a paddle wheel 26 having blades 27 arranged to take up water from the tank 10 and throw it laterally and downward through the screen 21 upon the articles in the compartment 22. A deflector 28 which extends over the outer upper portion of said paddle wheel aids in properly directing the water. It will be evident that as the tank 10 is quite deep and the dishes are near the bottom of it while being washed, by thus directing the wash water downwards there is practically no danger of splashing water out of the tank.

The paddle wheel 26 is fixedly mounted upon a shaft 29 so as to rotate therewith, and as best shown in Fig. 5, one end of said shaft extends through an opening in the wall of the tank 10, and is supported by means of an anti-friction bearing 30 of any suitable type carried by a sleeve bracket 31 secured to the outside of the tank. A gasket 32 of any suitable material is interposed between the shaft and the wall of the tank 10 for preventing water from splashing out around the shaft, and a cap 33 is tightly fitted over the outer end of the sleeve bracket 31 to prevent leakage and protect the bearing.

The other end of the shaft 29 is similarly mounted in an antifriction bearing 34 fitted in an external pocket in a housing 35 which is secured over the wall opening around this end of the shaft. The shaft 29 is driven by means of a bevel gear 39 keyed upon the outer end of said shaft, which meshes with a bevel pinion 40 non-rotatably mounted upon the lower end of a shaft 41 which has a bearing in the housing 35. A cap 42 closes the outer face of the housing 35, as best shown in Fig. 5. The upper end of the shaft 41 is supported by a suitable bearing carried by a bracket 43 which is secured to the outside of the tank and comprises a housing 44 closed by a cap 45, as best shown in Fig. 1. A bevel gear 46 is non-rotatably mounted upon the upper end of the shaft 41, meshing with which is a bevel pinion 47 fixed upon the armature shaft of a motor 48 which is mounted on top of the tank 10 at one side of the tank 12. A hood 49 is preferably provided over the motor, which hood is removably secured at its edges to the walls of the tanks 10 and 12 in any suitable way, as shown in Fig. 1. 50 indicates a drain pipe for drawing off the water in the tank 10, said pipe being equipped with a valve 51, as shown in Fig. 1.

In using the machine the tank 10 is filled to the desired extent with hot water containing a cleansing agent, and the tank 12 with clean hot water. A basket containing the dishes to be washed is then placed on the screen 24 and the motor 48 is started. The paddle wheel is thereby rotated in a counter-clockwise direction as viewed in Fig. 1, so that the paddles 27 scoop up the water and dash it forcibly through the screen 21 upon the dishes in position on the support. By reason of the paddle wheel being located below the tank 12, the bottom of said tank serves as a deflector and aids in directing the water laterally into the washing compartment 22. The mass of water thrown by the paddle wheel is broken up to some extent by the screen 21 so that it is well distributed over and among the dishes and they are thoroughly cleansed. When a basketful of dishes has been washed the basket is transferred to the rinsing tank 12 leaving the tank 10 free to receive a fresh basket for a repetition of the washing operation.

By the construction described I provide a very compact and efficient machine by which dishes may be safely and quickly cleansed, and which is well adapted for installation in dining cars and other situations where the available space is limited. Furthermore, as most of the water is carried practically at the floor level and both tanks are provided with high walls, there is practically no danger of the splashing out of water owing to swaying of the car, or the operation of the machine. Both tanks and most of the operating mechanism being enclosed by a continuous housing the machine presents a neat appearance, which is obviously desirable.

What I claim as my invention and desire to secure by Letters Patent, is—

1. A washing machine comprising a housing containing a tank adapted to hold wash water, said housing being arranged for the vertical introduction into said tank or removal therefrom of the dishes to be washed, means for supporting dishes above the water in said tank, a rinsing tank in said housing adjacent to said wash water tank, and means in said housing below said rinsing tank adapted to throw water from said wash water tank toward the bottom of the rinsing tank and against the dishes carried by said supporting means.

2. A washing machine comprising a tank adapted to contain wash water, said tank being arranged for the vertical introduction thereinto or removal therefrom of the dishes to be washed, a rinsing tank forming one side wall of the upper portion of said wash water tank, and means below said rinsing tank for throwing water laterally against dishes in the lower portion of said wash water tank the bottom of the rinsing tank forming a deflector which aids in directing the wash water against the dishes.

3. A washing machine comprising a housing containing a tank adapted to hold wash water, said housing being arranged for the vertical introduction into said tank or removal therefrom of the dishes to be washed, means in said tank for supporting the dishes above the water therein, means at one side of said tank for throwing water therefrom against the dishes carried by said supporting means, a rinsing tank in said housing above said water throwing means, the bottom of said rinsing tank being at a higher level than that of the wash water in said wash water tank, and an overflow pipe leading from said rinsing tank to said wash water tank.

4. A washing machine comprising a housing containing a tank adapted to contain wash water, a paddle wheel revolubly mounted to rotate about a horizontal axis in said housing at one side of the lower portion thereof, a rinsing tank above said paddle wheel, said tanks being arranged for the vertical introduction thereinto or removal therefrom of the dishes to be washed, a motor mounted in said housing above said paddle wheel at one side of said rinsing tank, and means operatively connecting said motor with said paddle wheel.

GEORGE S. BLAKESLEE.